United States Patent
Westhaver

[11] 3,760,629
[45] Sept. 25, 1973

[54] CAMERA SHUTTER TIMING DEVICE

[76] Inventor: Lawrence A. Westhaver, 13001 Old Stagecoach Rd., Laurel, Md. 20810

[22] Filed: June 1, 1971

[21] Appl. No.: 148,469

Related U.S. Application Data

[63] Continuation-in-part of Ser. No. 865,391, Oct. 10, 1969, Pat. No. 3,603,133.

[52] U.S. Cl. ................................................. 73/5
[51] Int. Cl. ..................... G03b 43/02, G04f 11/08
[58] Field of Search ...................... 73/5; 250/214 P, 250/229; 346/108

[56] References Cited
UNITED STATES PATENTS

| | | | |
|---|---|---|---|
| 2,261,010 | 10/1941 | Weiss | 73/5 X |
| 2,477,578 | 8/1949 | Coleman | 73/5 |
| 3,603,133 | 9/1971 | Westhaver | 73/5 |

Primary Examiner—Richard C. Queisser
Assistant Examiner—Joseph W. Roskos
Attorney—James W. Westhaver

[57] ABSTRACT

A device for timing photographic shutters, functions related thereto (i.e., sync advance or delay), or any occurrence that can be translated into a pulse of light within the timing range of the device. The device comprises a base casing the top wall of which forms an unobstructed platform to support various types of camera shutters in overlying relation to a photocell. An upper casing, supported by hollow columns in elevated relation from the base casing, carries on its bottom wall a downwardly directed lamp vertically above the photocell. The forward wall of the upper casing has a window for eye-level readout of shutter time. The two casings individually contain electronic means jointly necessary to obtain the readout time, power and signals from the lower to the upper casing being delivered by a cable through one of the hollow columns.

5 Claims, 2 Drawing Figures

CAMERA SHUTTER TIMING DEVICE

CROSS-REFERENCE TO RELATED APPLICATIONS:

This application is a continuation in part of U.S. Pat. Ser. No. 865,391, filed Oct. 10, 1969, now U.S. Pat. No. 3,603,133, granted Sept. 7, 1971 in which the basic method performed by the device of the present invention is claimed.

BACKGROUND OF THE INVENTION

1. FIELD OF THE INVENTION

Conventional cameras contain a broad and selective range of shutter speeds, enabling the photographer to adjust the shutter speed, as desired. Presumably, the shutter operates at the selected speed. However, as a practical matter, very little attention has been given to measuring the shutter speed to determine if the actual speed of the shutter is equivalent to the calibration presented for the selected speed. Experience indicates that, more often than not, there are wide discrepancies between the calibrated speed and the actual speed obtained. Experience indicates, furthermore, that, for speeds in excess of one one-hundredth of a second the amount of error may exceed 50 per cent.

The present invention is directed to providing a device for accurately and conveniently measuring shutter speed. As a result, the camera manufacturer, as well as the photographer, can be provided with accurate knowledge as to the actual shutter speed obtained in a given camera. The device is extended to measuring, also, the number of frames per second obtained in a motion picture camera.

2. DESCRIPTION OF THE PRIOR ART

Prior art searching has developed the following prior art:

Abell U.S. Pat. No. 2,602,324
Richard U.S. Pat. No. 3,046,555
Goldfarb U.S. Pat. No. 3,229,497
Handbook of Industrial Electronic Control Circuits (by Markus and Zeluff, McGraw-Hill, 1956 page 195)

These references show that a good deal of attention has been directed to shutter timing. However, the apparatus for testing is relatively complex and is circuit-dependent to the extent that variations or load in the testing circuit may influence the detected timing of the shutter. Also, the devices are not, for the most part, adaptable to repetitive testing in a workshop situation, such that the tested shutter can be adjusted, thence repetitively tested. Furthermore, none of the devices enables the accurate measurement of timing of the shutter from the half-open to the half-closed position, as is inherent in the present device.

SUMMARY OF THE INVENTION

A photo sensitive field-effect transistor, in a source follower configuration, senses a pulse of light passed by the shutter of a camera under test. With one set-up adjustment, the sensor and associated circuitry will produce an electrical pulse the duration of which is equal to the time between the half-open and the half-closed conditions of the shutter. This is the effective period of the shutter.

Two storage flip-flops with an "exclusive or" gate form a logic circuit capable of producing an electrical pulse the duration of which is equal to the time interval between two events (shutter opening and synch switch closing or vice versa).

Measurement of the duration of either of the aforementioned pulses is accomplished by using the pulse to enable the passage of clock pulses thru an electronic gate and counting the number of pulses passed with a counter.

Depending upon the expected length of the pulse, an appropriate clock pulse rate is selected. The fundamental output of a crystal controlled oscillator is successively divided in tenths by a series of decade counters. This provides a selection of clock pulse rates.

An extension of the same timing chain provides a timing capability for determining the average frames/second rate of a motion picture camera over a several second interval.

A digital read-out is provided for the test result contained in the final counter.

The present invention is directed to a unitary portable device which incorporates the above components in a novel arrangement of casings and support structure to enable the testing of cameras and projectors in a facile manner.

DESCRIPTION OF THE PREFERRED EMBODIMENTS

Figure 1:
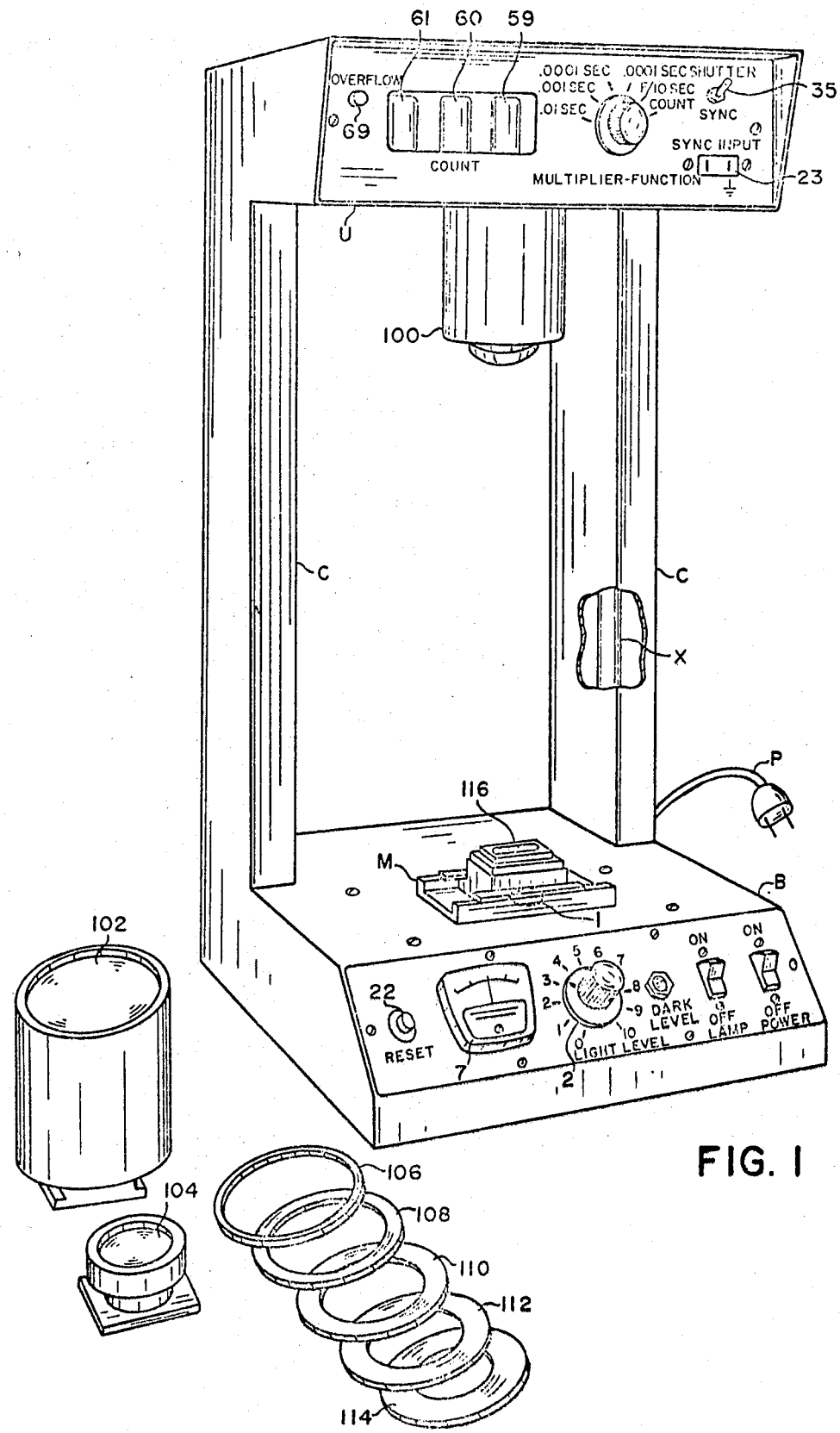
FIG. 1 is a perspective view of the shutter timer device, constructed according to the present invention, having a light source positioned at the top and a mandrel for supporting a camera adjacent a photo-sensing element in the bottom; with various diffuser elements being shown in an explosive view.

Referring to FIG. 1, the device comprises a base casing B, an upper casing U, and a pair of hollow columns C supporting the casing U in elevated position above the base casing.

Leading into the base casing is power supply cord P to be plugged into a 117 V.A.C., supply.

The upper wall of the base casing has an aperture exposing a photocell in the form of a photosensitive field effect transistor 1 and vertically thereabove is a lamp source 100 carried on the underside of the upper casing.

The upper wall of the base casing carries a mandrel M adapted to receive various attachments to conduct the light from lamp 100 to the exclusion of extraneous light and to support the camera shutter under test. These attachments include selectable diffusers 102 and 104, and various shrouds 106, 108, 110, 112 and 114 adapted to rest on diffuser 102 which in turn support a between-the-lens shutter to be tested. A shroud 116, shown on the mandrel, may be used to support a focal-plane shutter. A 45° mirror may be used to deliver light to the photocell from an illuminated motion picture camera shutter measuring frames per second.

The base casing has a sloping front wall which carries the knobs and indicia for reset 22, light level selector 2, and the on-off lamp and power switches. This front wall also carries the voltmeter 7 and the dark level adjustment fixture.

Figure 2:
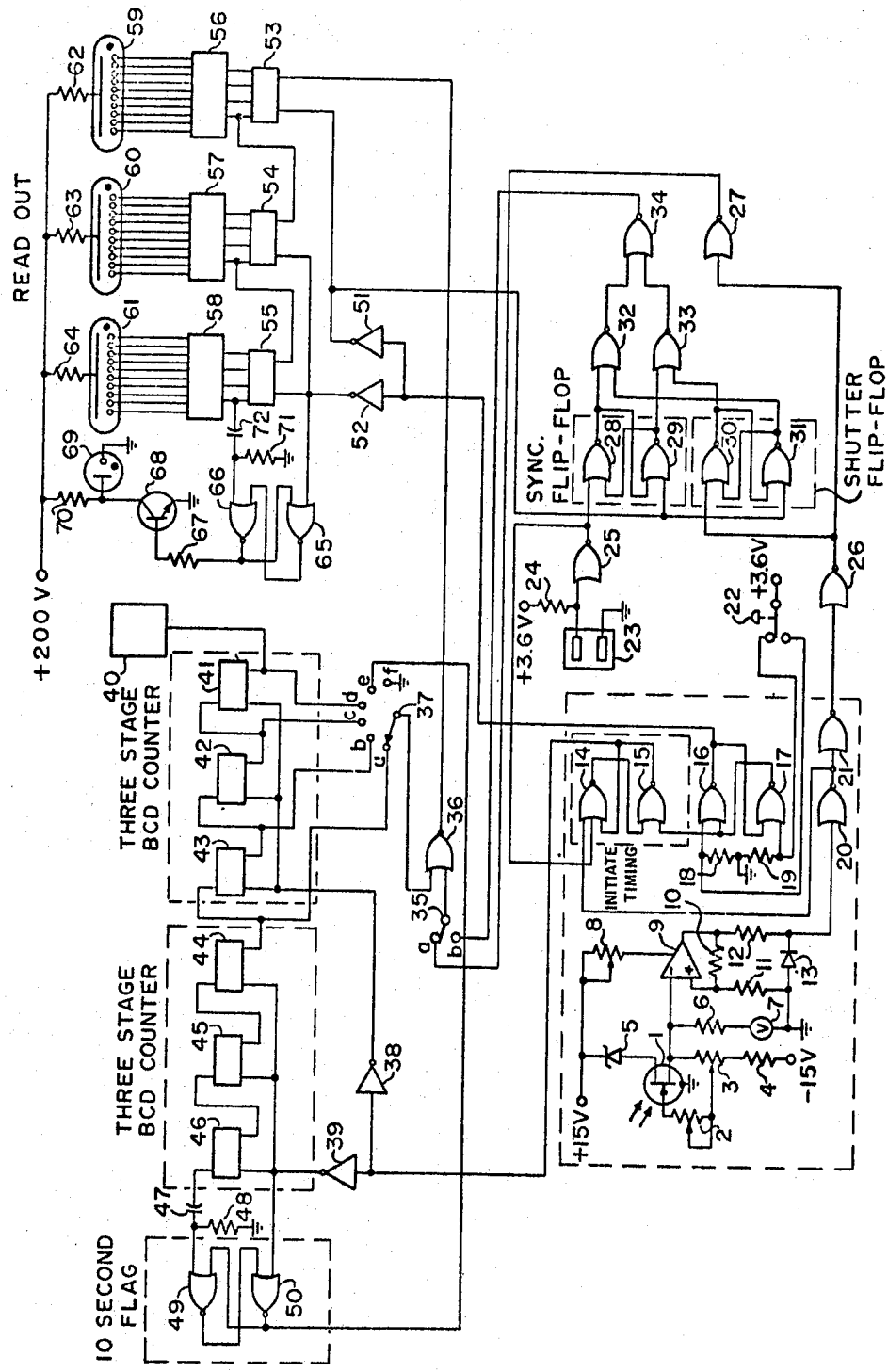
FIG. 2 is a circuit diagram of the circuit for timing a shutter according the present invention.

The base casing houses the power supply to produce the various voltages indicated in FIG. 2 and also the electronic circuitry which receives the signal from the photocell, this circuitry being within the dotted rectangle as shown in FIG. 2.

The upper casing U has a recessed front wall with a window for the read-out tubes 59, 60 and 61 and carries the over-flow neon lamp 69, the knobs and indicia for the multiplier-function and the shutter sync switch 35.

This wall also carries the plug-in receptacle 23 for the shutter-sync cable from the camera.

The upper casing houses primarily the electronic timing circuitry and various gates associated therewith as will be described with reference to FIG. 2.

The supporting columns C are hollow and one of these contains a cable X conducting power and signals from the base casing to the upper casing.

In FIG. 2 the photosensitive field effect transistor 1 is connected in a source follower configuration. Potentiometer 3 together with resistor 4 form the source load ($R_S$). Zener diode 5 serves only to decrease the voltage on the drain of the transistor. Variable resistor 2, the gate resistance ($R_G$), is connected in a bootstrap configuration to the wiper of potentiometer 3.

The source follower configuration exhibits a voltage gain less than unity. Therefore the input capacitance is at a minimum being comprised of the drain to gate capacitance ($C_{DG}$) in parallel with the effective gate to source capacitance, $C_{GS}$ effective $= C_{GS} (1-Av)$, when Av is the voltage gain of the stage). Reduction of the input capacitance is very important since the ability of the circuit to track a pulse of light is limited by the RC time constant of the input. The effective input resistance of the circuit will be $R_G$ (the setting of resistor 2) multiplied by a factor based on the setting of potentiometer 3.

In the absence of light, neglecting an infinitesimal leakage current, there will be no voltage drop across resistor 2. Potentiometer 3 should be adjusted for a circuit output voltage at some arbitrary negative level. This level will be indicated on zero-center voltmeter 7. Resistor 6 prevents overload of meter 7. When light is fully admitted to the transistor 1, as would be the case during the full opening of a shutter under test, a leakage current proportional to the light flows in the gate ($I_G$). This current flowing thru the effective input resistance produces a voltage drop which forces the output of the circuit to rise to a more positive voltage level. By adjustment of resistor 2 the voltage level may be made equal in magnitude to the negative voltage level and positive with respect to ground. Voltmeter 7 facilitates this adjustment.

With the completion of the aforementioned adjustment, when the shutter under test is operated a trapezoidal pulse will be generated. The mid-point of the rise and the mid-point of the fall of the pulse will be at zero volts. The rise and fall times of the pulse correspond to the opening and closing times of the shutter respectively.

Operational amplifier 9, connected as a Schmidt trigger, receives the output of the source follower at its inverting input. Resistors 10 and 11 form a regenerative feedback loop from the output of the amplifier to the non-inverting input of the amplifier. The hysteresis of the Schmidt trigger is determined by the ratio of resistor 10 to resistor 11, i.e., hysteresis = C out-peak R11/R10+R11 where C out-peak is the maximum voltage that the output can swing away from zero. If the hystersis is made small (R10>R11) then the input positive and negative switching points will be near zero.

With a trapezoidal pulse at the inverting input of operational amplifier 9 the output of the amplifier will be a pulse the duration of which will be equal to the time between the half-open and the half-closed conditions during a shutter operation.

Since the output of the operational amplifier swings both positive and negative and the logic circuits accept only a zero to positive input, resistor 12 and diode 13 are connected as an intermediate clipper to eliminate the negative excursion. Variable resistor 8 is used only to initially balance the amplifier and once set need not be readjusted.

Single-pole-double-throw push-button switch 22 is the reset means enabling the operator to initialize the circuitry before making a test. It is shown in the unactivated state. Gate 16 and gate 17 are cross coupled to form a set-reset flip-flop. This flip-flop removes the switch-contact-bounce noise when the reset push button switch 22 is operated. When reset push button 22 is operated the output of gate 16 goes to "zero" and the output of gate 17 goes to a "one." Upon release of the reset the output of gate 16 returns to a "one" and gate 17 returns to a "zero." Resistors 18 and 19 return the gate inputs to ground whenever the inputs are not being held at a "one" by the switches.

Gates 14 and 15 are cross coupled to form a set-reset flip-flop. A reset connection is provided from the output of gate 17 to an input of gate 15. The flip-flop is initialized by operation of reset 22 which stores a "zero" at the output of gate 15 and a "one" at the output of gate 14. The inputs capable of setting the flip-flop originate at the output of gate 20 (an inverter controlled by the shutter circuitry) and the output of inverter 25 (an inverter controlled by the closing of the sync switch contacts). In any test performed with this instrument a pulse will be generated by the shutter circuitry. This pulse may be followed by or preceded by a pulse originating at the sync switch contacts. Upon the rise of either the "shutter" pulse or the "sync" pulse, the flip-flop will be set (the output of gate 14 will be "zero" and the output of gate 15 will be "one"). The setting of this flip-flop, hereinafter referred to as the "initiate timing" flip-flop, enables the clocking circuitry thru buffer inverters 38 and 39.

Buffer inverter 39 drives the reset inputs of BCD (binary-coded decimal) counters 44, 45, 46 and gate 50. The reset inputs of BCD counters 41, 42, and 43 are driven by buffer inverter 38. Under control of the same input, the outputs of 38 and 39 are logically the same. The limited load driving ability (fan-out) of the buffer inverter circuit made necessary the division of the reset loads between two buffer inverters.

Prior to a test, the outputs of buffer inverters 38 and 39 are at a "one" which holds the BCD counters 41, 42, 43, 44, 45 and 46 in a reset condition. Thru an input to gate 50, buffer inverter 39 also holds reset a flip-flop consisting of gates 49 and 50.

Initialization, by operation reset 22, produces a "zero" at the output of gate 16 which is applied to the inputs of buffer-inverters 51 and 52. The output of buffer inverter 52, which is at a "one" state, resets BCD counters 54 and 55 and, thru an input to gate 65 resets a flip-flop comprised of gates 65 and 66. BCD counter 53, a flip-flop consisting of gates 30 and 31 and a flip-flop consisting of gates 28 and 29, are reset by the output of buffer inverter 51, Again, the outputs of buffer inverters 51 and 52 are logically the same and circuit fan-out dictates the use of two circuits.

Upon release of reset 22, the outputs of buffer inverters 51 and 52 return to a zero state. All circuits are thus reset and ready for initiation of a test.

The pulse repetition rate of free running crystal controlled oscillator 40 was chosen to be 100 kpps (an integer power of ten). This pulse repetition rate is selectable at position $d$ of switch 37, providing timing in increments of 10 microseconds, and is applied at the input of BCD counter 41. BCD counter 41 cannot respond to this input signal until the reset input is returned to a "zero" state. When the "timing initiate" flip-flop sets, indicating the start of a test, the outputs of buffer inverter 38 and 39 return to a "zero" state enabling normal counter action in BCD counters 41, 42, 43, 44, 45 and 46. The Z8 output of each BCD counter is connected to the input of the succeeding counter providing six successive divisions by 10 of the input pulse repetition rate. The pulse repetition rates of the Z8 outputs of counters 41, 42 and 43 are 10 kpps, 1 kpps and 100 pps respectively. These output signals are selectable at positions $c$, $b$ and $a$ of switch 37 providing timing in increments of 100$\mu$S, 1 ms and 1 cs respectively. Further division of the pulse repetition rate is accomplished by BCD counters 44, 45 and 46. The cycle time of the outputs is 0.1 sec, 1 sec and 10 sec respectively.

When in the reset state the Z8 output of counter 46 is at a "one" condition. This does not affect the input of gate 49, the static voltage level being blocked by capacitor 47. With resistor 48 returning one input of gate 49 to a "zero" and the output of gate 50 holding the other input at "zero," the output of gate 49 is at a "one" condition. The outputs of gates 49 and 50, cross coupled forming a set-reset flip-flop, will remain stable when the output of buffer inverter 39 switches from a "one" to a "zero" state. When the outputs of buffer inverters 38 and 39 switch from a "one" to a "zero," counting action is started in the chain of BCD counters and the flip-flop comprised of gates 49 and 50 is no longer held in a reset condition. As previously noted, BCD counter 46 has a cycle period of 10 seconds and in the reset condition the Z8 output is at a "one." During the cycle period of 10 seconds, the Z8 output will fall to a "zero." This transition is differentiated by capacitor 47 and resistor 48 producing a negative voltage spike at the input of gate 49. Since a positive voltage is required to set the flip-flop it will remain in the reset condition. At the end of ten seconds the Z8 output of BCD counter 46 will switch again to a "one." Again the transition is differentiated, this time producing a positive voltage spike at the input of gate 49 which sets the flip-flop. The setting of the flip-flop, comprised of gates 49 and 50 hereinafter referred to as the "ten second flag," occurs 10 seconds after the setting of the "timing initiate" flip-flop. Discounting the small error in the frequency of crystal controlled oscillator 40, the only error in the length of the 10 second period will be an uncertainty of 10 sec (the length of one cycle of the crystal controlled oscillator) in starting plus the propagation time thru the six BCD counter stages and "10 second flag" flip-flop (typically a delay of less than 2 $\mu$ sec.)

Inverter 21 drives the line which transmits the "shutter pulse" from the lower housing to the upper housing.

Inverter 26 acts as a receiver of the signal. The output of inverter 26, except for a very minute time delay, will be the same as the output of inverter 20 (due to double inversion).

Electrical receptacle 23 is a means of connecting via a cable the sync switch contacts in the shutter under test to the logic circuitry. Load resistor 24 returns the input to inverter 25 to a "one" condition when the contacts are open. When the sync contacts close the input to inverter 25 is grounded, a "zero" condition. The output of inverter 25 will then be a "one" which will set, thru an input to gate 14, the "timing initiate" flip-flop, and, thru an input to gate 28, a flip-flop consisting of gates 28 and 29. Gates 28 and 29 are the "sync" flip-flop.

In like manner, when the shutter under test is operated, the shutter pulse at the output of gate 26 will, thru an input to gate 30, set a flip-flop consisting of gates 30 and 31. Gates 30 and 31 form the "shutter" flip-flop.

The reset output of the "sync" flip-flop (output of gate 28) is applied to one input to gate 32. The set output of the "sync" flip-flop (output of gate 29) is applied to one input of gate 33. Similarly, the reset output of the "shutter" flip-flop (output of gate 30) is applied to the other input of gate 33 and the set output (output of gate 31) is applied to the other input to gate 32. The outputs of gates 32 and 33 form the inputs to gate 34.

In Boolean notation the output of gate 32 may be written:

$32 = \overline{\overline{sync} + shutter} = sync \cdot \overline{shutter}$. The output of gate 33 may be written:

out $33 = \overline{sync + \overline{shutter}} = \overline{sync} \cdot shutter$. The output of gate 34 may be written:

out $34 = sync \cdot \overline{shutter} + \overline{sync} \cdot shutter$. From the equation for the output of out gate 34 it is apparent that the output is at a "one" prior to a test (when "shutter" and "sync" flip-flops are reset) and that the output will be at a "zero" only during the interval between the opening of the shutter (setting of "shutter" flip-flop) and the closing of the sync contacts (setting of "sync" flip-flop) or vice versa. The output then of gate 34 will be a pulse, at the "zero" condition, the length of which is equal to the absolute time difference between the occurrence of the two events. This pulse is selectable at position b of switch 35.

Inverter 27 provides a pulse, at the "zero" condition, the length and timing of which is the same as the "shutter" pulse. This pulse is selectable at position a of switch 35.

Determination of the duration of either the sync interval pulse or the shutter pulse is accomplished by gating an appropriate clock signal from the wiper of switch 37 (positions $a$, $b$, $c$ or $d$) with the selected pulse at the inputs of gate 36. Gate 36 will allow the clock signal to propagate thru to the input of BCD counter 53 only when enabled by the presence of the pulse to be measured.

BCD counters 53, 54 and 55 count the clock pulses propagated during a test to a maximum capacity of 999 counts. If that count is exceeded the flip-flop consisting of gates 65 and 66 will fall to a "zero" state shutting off base current to transistor 68 thru current limiting resistor 67. This switches transistor 68 from saturation to cut-off and the collector potential will rise to the ionization potential of neon-indicator 69, lighting it. Resistor 70 serves to limit the current thru indicator 69. If indicator 69 (the "overflow" indicator) lights in the course of a test, the test should be repeated using a slower clock-pulse rate.

Decoder drivers 56, 57 and 58 serve to decode the BCD outputs and to drive the appropriate cathode in the gas-filled-decimal-numeric read-out tubes. Resistor 62, 63 and 64 serves to limit the current thru their read-out tubes 59, 60 and 61 respectively.

With switch 35 in position a and switch 37 in position e the instrument can count the number of shutter pulses occurring in a 10 second period (useful for checking motion picture cameras). Once reset, the instrument waits for the first shutter pulse. When it occurs, it sets the "timing initiate" flip-flop which enable the BCD counter timing chain. The output of gate 50 of the "10 second flag" flip-flop, at a "zero," enables the propagation of the shutter pulses thru gate 36 to BCD counter 53 until the flip-flop sets at the end of the 10 seconds.

Position f of switch 37 is provided to enable the counting of shutter pulses without time limit.

I claim:

1. A unitary device for timing photographic shutters comprising: a base casing; an upper casing; means supporting the upper casing in elevated position from the base casing; a downwardly directed lamp carried by the bottom wall of the upper casing; a photocell in the base casing vertically below the lamp; means on the top wall of the base casing constructed to support a camera shutter and to pass light coming through the shutter to said photocell; circuit means in the base casing for receiving the signal from said photocell; and electronic timing means including a digital read-out in the upper casing and having connections receiving the signal from said photocell to time its effective duration.

2. The device of claim 1, said upper casing having an input for the cable from the sync contact of the camera shutter, and circuit means connected to said input and operative to activate the timing means to thereby measure the effective time between shutter opening and sync contact or vice versa.

3. The device of claim 1 wherein said means supporting the upper casing comprises a pair of hollow columns, and wherein said connections pass through one of said columns.

4. The device of claim 1 having selective circuitry to render the digital read-out effective to count light pulses received by said photocell from an illuminated motion picture camera shutter or a motion picture projector.

5. The device of claim 4 wherein said selective circuitry includes means to stop the counting of light pulses at the end of 10 seconds.

* * * * *